(12) United States Patent
Mehrvar et al.

(10) Patent No.: US 10,396,893 B2
(45) Date of Patent: Aug. 27, 2019

(54) SYSTEM AND METHODS FOR DETERMINING PROPAGATION DELAY

(71) Applicants: Hamid Mehrvar, Ottawa (CA); Peter Ashwood-Smith, Gatineau (CA)

(72) Inventors: Hamid Mehrvar, Ottawa (CA); Peter Ashwood-Smith, Gatineau (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/261,401

(22) Filed: Sep. 9, 2016

(65) Prior Publication Data

US 2018/0076886 A1 Mar. 15, 2018

(51) Int. Cl.
*H04B 10/40* (2013.01)
*H04B 10/079* (2013.01)
(Continued)

(52) U.S. Cl.
CPC ... *H04B 10/07951* (2013.01); *H04B 10/0775* (2013.01); *H04B 10/2504* (2013.01);
(Continued)

(58) Field of Classification Search
CPC ....... H04B 7/2684; H04B 1/40; H04L 7/0008; H04L 7/0037; H04L 7/00; H04L 7/0075
(Continued)

(56) References Cited

U.S. PATENT DOCUMENTS 5,999,543 A * 12/1999 Bortolini ............... H04J 3/0688
370/503

7,710,941 B2 * 5/2010 Rietschel ............... H04J 3/0664
370/350
(Continued)

FOREIGN PATENT DOCUMENTS

| CN | 102412955 A | 4/2012 |
|---|---|---|
| CN | 102742190 A | 10/2012 |
| EP | 2615752 A1 | 7/2013 |

OTHER PUBLICATIONS

International Search Report dated Apr. 21, 2017 for International Patent Application No. PCT/CN2016/099731 filed Sep. 22, 2016.
(Continued)

*Primary Examiner* — Emmanuel Bayard (57) ABSTRACT

One aspect of the disclosure is directed to a system and method for determining the propagation delay for a signal to traverse an optical fiber between two transceivers. The method is performed by the first transceiver and includes transmitting a message to the second transceiver over a first optical fiber. The method further includes receiving on the first optical fiber a reply message from the second transceiver including an indication of the internal time for the second transceiver to transmit the reply message. The method further includes determining the time interval from the time the message was transmitted to the time the first transceiver received the reply message. The method further includes calculating the propagation delay from the time interval and the internal time. The method further includes configuring the first transceiver to receive data traffic from the second transceiver on a second optical fiber. Another aspect is directed to a system and method for using the determined propagation delay to synchronize the two transceivers.

14 Claims, 8 Drawing Sheets

(51) Int. Cl.
   *H04B 10/25* (2013.01)
   *H04L 7/00* (2006.01)
   *H04Q 11/00* (2006.01)
   *H04J 3/06* (2006.01)
   *H04L 12/26* (2006.01)
   *H04B 10/077* (2013.01)

(52) U.S. Cl.
   CPC ............ *H04B 10/40* (2013.01); *H04J 3/0667* (2013.01); *H04L 7/0075* (2013.01); *H04L 43/0864* (2013.01); *H04Q 11/0005* (2013.01); *H04L 43/106* (2013.01); *H04Q 2011/0058* (2013.01); *H04Q 2011/0083* (2013.01)

(58) Field of Classification Search
   USPC .................................. 375/219–222, 354–359
   See application file for complete search history.

(56) References Cited

U.S. PATENT DOCUMENTS

| | | | |
|---|---|---|---|
| 9,130,670 B2 | 9/2015 | Jobert et al. | |
| 9,638,755 B2* | 5/2017 | Wolfe | G01R 31/3278 |
| 2006/0291537 A1* | 12/2006 | Fullerton | G01S 7/4052 375/145 |
| 2008/0291883 A1* | 11/2008 | Seok | H04W 64/00 370/338 |
| 2009/0232113 A1* | 9/2009 | Tamaki | H04W 56/0045 370/337 |
| 2009/0253439 A1* | 10/2009 | Gantner | G01S 5/0063 455/456.1 |
| 2010/0002591 A1* | 1/2010 | Mizutani | H04L 43/0852 370/241.1 |
| 2010/0098407 A1* | 4/2010 | Goswami | H04B 10/032 398/5 |
| 2010/0302697 A1* | 12/2010 | Adachi | H02H 3/30 361/87 |
| 2012/0224846 A1* | 9/2012 | Swanson | H04B 10/0705 398/13 |
| 2012/0263220 A1 | 10/2012 | Li et al. | |
| 2012/0275501 A1* | 11/2012 | Rotenstein | H04J 3/0667 375/220 |
| 2013/0005347 A1* | 1/2013 | Curticapean | H04W 64/00 455/456.1 |
| 2013/0039359 A1* | 2/2013 | Bedrosian | H04J 3/0667 370/350 |
| 2013/0195443 A1 | 8/2013 | Yin et al. | |
| 2013/0202291 A1 | 8/2013 | Cavaliere et al. | |
| 2013/0294762 A1* | 11/2013 | Nonaka | H04B 10/032 398/2 |
| 2014/0010094 A1* | 1/2014 | Robitaille | H04L 43/0852 370/252 |
| 2014/0016926 A1* | 1/2014 | Soto | H04B 10/0775 398/16 |
| 2014/0029933 A1* | 1/2014 | Le Rouzic | H04B 10/071 398/16 |
| 2014/0064303 A1* | 3/2014 | Aweya | H04J 3/0667 370/509 |
| 2014/0079409 A1 | 3/2014 | Ruffini et al. | |
| 2014/0169792 A1* | 6/2014 | Lee | H04J 3/0673 398/66 |
| 2014/0293869 A1* | 10/2014 | Jeffery | H04W 74/0808 370/328 |
| 2015/0098476 A1 | 4/2015 | Reese et al. | |
| 2015/0295669 A1* | 10/2015 | Chapman | H04L 5/0007 370/503 |
| 2016/0033578 A1* | 2/2016 | Wolfe | G01R 31/3278 324/754.03 |
| 2016/0170440 A1* | 6/2016 | Aweya | G06F 1/12 713/503 |
| 2016/0337091 A1* | 11/2016 | Kim | H04L 47/26 |
| 2017/0059701 A1* | 3/2017 | Oh | G01S 13/74 |
| 2018/0003838 A1* | 1/2018 | Morris | G01L 27/002 |
| 2018/0034542 A1 | 2/2018 | Fung et al. | |
| 2018/0191802 A1* | 7/2018 | Yang | H04L 65/608 |

OTHER PUBLICATIONS

IEEE Standard for a Precision Clock Synchronization Protocol for Networked Measurement and Control, IEEE std 1588, Jul. 24, 2008.
Serrano, J. et al., The White Rabbit Project, 2013 (https://www.ohwr.org/projects/white-rabbit/wiki/WRpublications).
Garner, G.M., Upldate on High Accuracy Work in IEEE P1588 Working Group, IEEE 802.1 AVB TG, Jan. 19, 2014.

* cited by examiner

SYSTEM AND METHODS FOR DETERMINING PROPAGATION DELAY

FIELD OF THE INVENTION

The present invention pertains to the field of communication networks, and in particular to a transceiver system using optical communications.

BACKGROUND

Optical communication systems typically involve each optical fiber including signals transmitted in a single direction. Accordingly two different optical fibers are used for two-way transmission between transceivers. Prior art methods for determining propagation delay would measure the round trip delay by sending a signal from a first transceiver to the second transceiver in one direction using one optical fiber, and receiving a reply from the second transceiver to the first transceiver in the return direction on another optical fiber. Such a method can measure the round trip propagation delay. However these two different fibers typically have different lengths, and therefore different propagation delays for signals that traverse the two optical fibers.

Next generation of wireless networks are expected to utilize optical fibers to connect transceivers at antennas to transceivers at base stations or cloud radio access network (C-RAN) data centers.

As communication systems become faster, by transmitting larger amounts of data per unit time interval, propagation delays between transmitting and receiving transceivers become more relevant. For example, an optical fiber of 2 m in length can introduce more than 10 nanoseconds (nsec) of propagation delay. However, it is expected that next generation of wireless networks that utilize optical backhauls from an antenna to a base station (or from a remote radio head to a C-RAN cluster) will have synchronization requirements in the order +/−8 nsec. In such a system the difference in lengths between the two optical fibers used for the two directions between the transceivers can exceed these synchronization requirements.

Accordingly, there is a need for a system and method that at least partially addresses one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

One aspect of the disclosure is directed to a system and method for determining the propagation delay for a signal to traverse an optical fiber between two transceivers. Another aspect is directed to a system and method for using the determined propagation delay to synchronize the two transceivers.

An aspect of the disclosure is directed to a method for determining the propagation delay between a first transceiver and a second transceiver. The method is performed by the first transceiver and includes transmitting a message to the second transceiver over a first optical fiber. The method further includes receiving on the first optical fiber a reply message from the second transceiver including an indication of the internal time for the second transceiver to transmit the reply message, wherein the internal time includes at least part of the time difference between the time the second transceiver received the message and the time the second transceiver transmitted the reply message. The method further includes determining the time interval from the time the message was transmitted to the time the first transceiver received the reply message. The method further includes calculating the propagation delay from the time interval and the internal time. The method further includes configuring the first transceiver to receive data traffic from the second transceiver on a second optical fiber. In some embodiments the first transceiver stores the transmit time when the first transceiver transmitted the message. In some embodiments determining the time interval includes retrieving the transmit time from storage and subtracting the time the reply message was received from the transmit time. In some embodiments the message includes a timestamp generated by the first transceiver to indicate the time the message was transmitted, and the reply message includes the timestamp. In some embodiments the indication of the internal time includes an internal time delay value inserted by the second transceiver. In some embodiments the indication includes: a receive timestamp indicating the time the second transceiver received the message; and a second timestamp indicating the time second transceiver transmitted the reply message. In which case, In some embodiments determining includes subtracting the receive timestamp from the second timestamp. In some embodiments the transmitter determines the one-way propagation delay through the first optical fiber by dividing the calculated propagation delay by two. In some embodiments both the first transceiver and the second transceiver are linked by a pair of fibers including the first fiber and a second fiber, and both include 2×2 switches for switching a connection from either of the pair of fibers between a transmit portion of the transceiver and a receive portion of the transceiver, the method further comprising switching the state of the 2×2 switch between the transmit step and the receive step such that both the transmit message and the receive message traverse the same fiber. In some embodiments the method further includes repeating the steps for the second fiber of the pair of fibers to calculate the calculating the propagation delay for the second fiber. In some embodiments the method further includes repeating the transmitting, receiving and determining steps to determine the time interval and internal time for several samples and calculating the average propagation delay. In some embodiments the method further includes synchronizing the first transceiver and the second transceiver using the calculated propagation delay. In some embodiments synchronizing includes adjusting an internal clock of the first transceiver using the calculated propagation delay and the indication of the internal time.

Another aspect of the disclosure provides a method for measuring a propagation delay between a first transceiver and a second transceiver. Such a method is performed by the second transceiver and includes receiving a message from the first transceiver over a first optical fiber. The method further includes determining the internal time for the second transceiver to transmit a reply message. The method further includes transmitting the reply message including an indication of the internal time on the first optical fiber, wherein the internal time includes at least part of the time difference between the time the second transceiver received the message and the time the second transceiver transmitted the reply message. In some embodiments the method further includes repeating the steps of receiving, determining and transmitting for a sequence of messages received from the first transceiver over the first optical fiber. In some embodiments the method further includes reconfiguring the second transceiver to a normal mode of operation in which the second transceiver transmits data to the first transceiver using a second optical fiber. In some embodiments the method further includes receiving instructions from the first transceiver as to how to synchronize the second transceiver with the first transceiver. In some such embodiments, the instructions include the propagation delay value for the first optical fiber.

Another aspect of the disclosure provides a transceiver. Such a transceiver includes a transmit path, a receive path, a first fiber interface for connecting to a first optical fiber, a second fiber interface for connecting to a second optical fiber and a switch for switching between a first state and a second state. The first state connects the transmit path to the first fiber interface and the receive path to the second fiber interface, and the second state connects the transmit path to the second fiber interface and the receive path to the first fiber interface. The transceiver further includes a processor and a non-transient memory for storing instructions which when executed by the processor cause the processor to control the transceiver. The instructions cause the transceiver to transmit a message to a second transceiver on the first optical fiber using the switch in the first state. The instructions further cause the transceiver to configure the switch to the second state to receive a reply message from the second transceiver on the first optical fiber, the reply message including an indication of the internal time for the second transceiver to process and reply to the message, and to calculate the propagation delay for the first optical fiber. In some embodiments the instructions further cause the processor to synchronize a clock of the first transceiver with a clock of the second transceiver.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
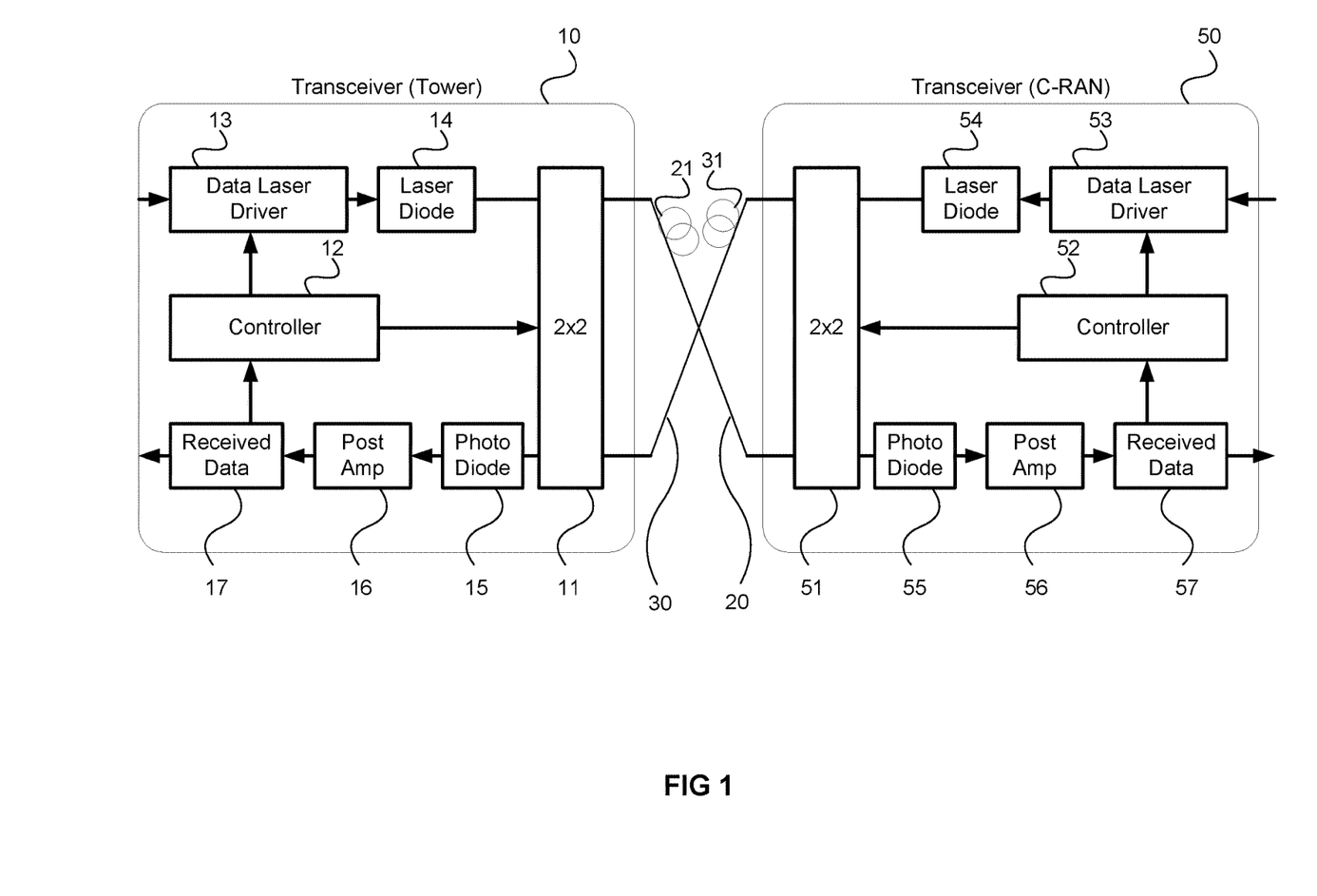
FIG. 1 illustrates a first transceiver connected to a second transceiver by a pair of optical fibers according to an embodiment.

FIG. 1 illustrates a block diagram of a networking system according to an embodiment. FIG. 1 illustrates an example wherein a first transceiver 10 is located at a wireless antenna tower, for example a remote radio head, and a second transceiver 50 forms part of a C-RAN data center. The first transceiver 10 includes a controller 12 for controlling the operation of the transceiver, a 2×2 switch 11, a transmit path and a receive path. The transmit path includes a data laser driver 13 and a laser diode 14. The receive path includes a photodiode 15 for converting a received optical signal into an electric current, an amplifier 16 and a receiving data module 17 for Analog/Digital conversion and detection of bits from the electric current. Similarly the second transceiver 50 includes a controller 52, a 2×2 switch 51, a transmit path transmit path including data laser driver 53 and laser diode 54, and a receive path including a photodiode 55, an amplifier 56 and a received data module 57. The two transceivers are linked by optical fibers 20 and 30. It is noted that the figure is not to scale, and the optical fiber 20 can be much longer than the size of the transceiver, and coil 21, schematically illustrates that fiber 20 can have a length that will typically run between 10 meters (m) and 20 kilometers (km). Optical fiber 30 is also schematically illustrated with coil 31, can have a different length that that of optical fiber 20.

The 2×2 switch 11 has two states. The first state, referred to as the bar state, links the transmit path (e.g., laser diode 14) of transceiver 10 with optical fiber 20 and links receive path (e.g., photodiode 15) of transceiver 10 with optical fiber 30. The second state, referred to as the cross state, links the transmit path (e.g., laser diode 14) of transceiver 10 with optical fiber 30 and links receive path (e.g., photodiode 15) of transceiver 10 with optical fiber 20. Similarly the 2×2 switch 51 has two states. The first state, referred to as the bar state, links the transmit path (e.g., the laser diode 54) of transceiver 50 with the optical fiber 30 and links receive path (e.g., photodiode 55) of transceiver 50 with the optical fiber 20. The second state, referred to as the cross state, links the transmit path (e.g., the laser diode 54) of the transceiver 50 with the optical fiber 20 and links the receive path (e.g., the photodiode 55) of the transceiver 50 with the optical fiber 30.

Accordingly when both switches 11, 51 are in the bar state, which will be the normal mode of operation, the transmit path (e.g., laser diode 14) of transceiver 10 is linked with receive path (e.g., photodiode 55) of the transceiver 50 via the optical fiber 20. Similarly configuring both switches 11, 51 in the bar state links the transmit path (e.g., laser diode 54) of transceiver 50 with receive path (e.g., the photodiode 15) of the transceiver 10 via the optical fiber 30. Configuring both switches 11, 51 in the cross state links the transmit path (e.g., laser diode 14) of the transceiver 10 with the receive path (e.g., photodiode 55) of the transceiver 50 via the optical fiber 30 and links the transmit path (e.g., laser diode 54) of the transceiver 50 with the receive path (e.g., photodiode 15) of the transceiver 10 via the optical fiber 20. Accordingly, switching the state of both switches 11, 51 effectively switches the optical fiber used for each direction of communication between the transceivers. As can be seen, switching the state of one switch (e.g. the switch 11) without making the corresponding switch in the other switch (in this example, the switch 51) is not useful, as such a state would link transmitters with transmitters and receivers with receivers. The 2×2 switches 11, 51 can be, for example, Silicon Photonic (SiPh) switches, Thermos-Optic Switches (TOS) or Carrier Injection Optical switches (CIO S).

It should be appreciated that controllers 12, 52 include a processor and machine-readable memory for storing instructions, which when executed by the processor, cause the controllers to execute the methods described herein. The controller can be implemented, for example, in a FPGA, ASIC, or SiPh/CMOS.

In normal operation, in this example the tower transceiver 10 would connect to the remote radio head transceiver 50. Circuitry (not shown) converts the received wireless signals for optical transmission via the data laser driver 13 for modulating the output of the laser diode 14 for optical transmission via the optical fiber 20 to the receive path of the transceiver 50 at the C-RAN for processing and forwarding to the core network. Similarly for downlink transmissions the C-RAN transceiver 50 would transmit signals on the optical fiber 30 for wireless transmission via the receive path of the transceiver 10. In this example, both switches 11 and 51 would operate in the bar state. It should be appreciated that other components such as internal clock sources would be included in the transceivers 10, 50 but are not shown, as are components other components for end to end transmission (such as those used for converting between wireless and electrical signals).

As stated, for such operation to work effectively, the two transceivers 10, 50 should be synchronized within a small margin, which in some cases can be within 8 nsec. Embodiments provide for a method and system which can determine the propagation delay in both optical fibers 20, 30 as part of a method and system for synchronizing the two transceivers 10, 50.

Figure 2A:
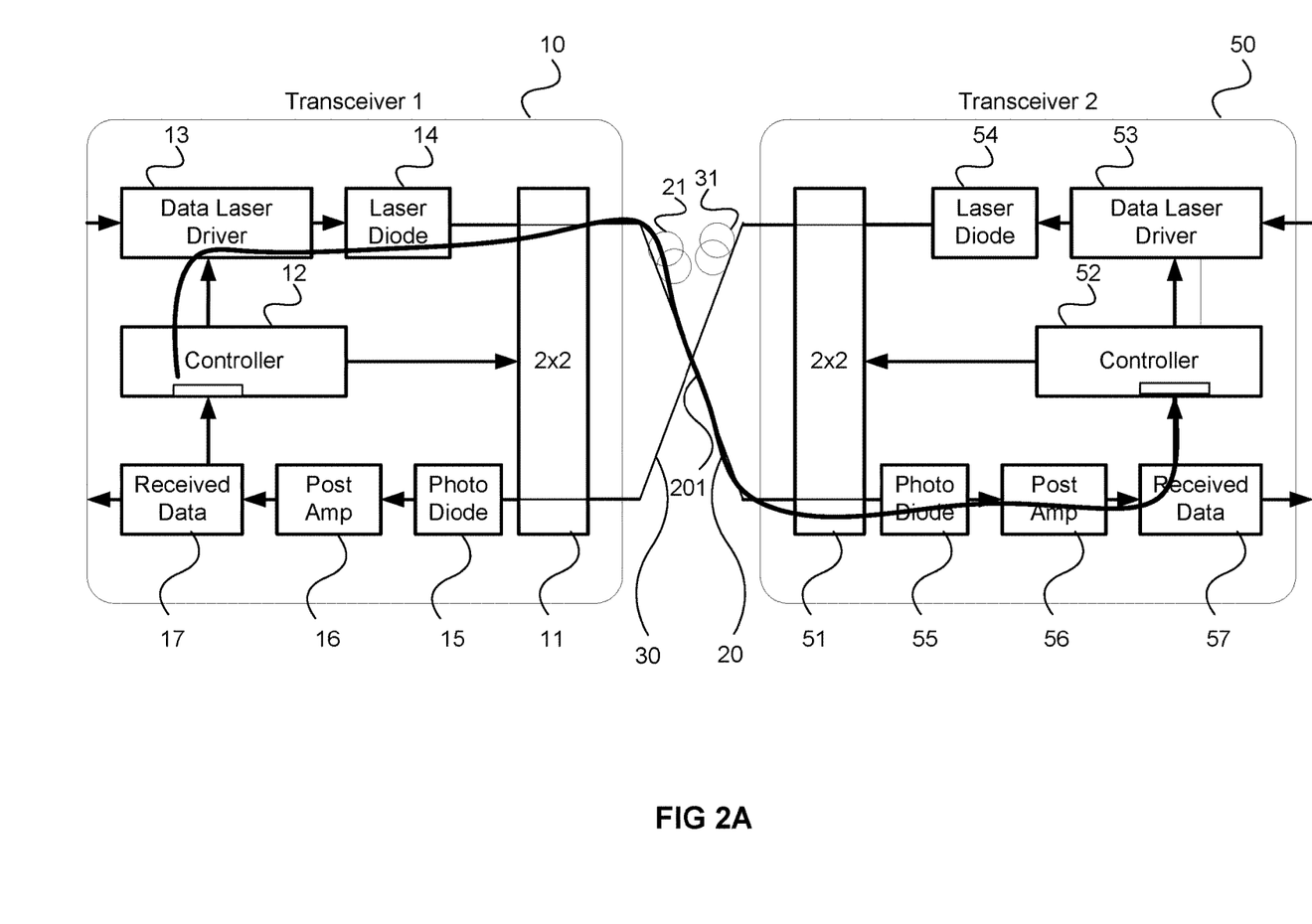
FIGS. 2A, 2B, 2C and 2D illustrate various states of the system in FIG. 1 according to an embodiment.

FIGS. 2A, 2B, 2C and 2D illustrate various states of the system in FIG. 1 according to an embodiment. FIGS. 2A-D also illustrate a method of determining the propagation delay, according to an embodiment. FIG. 2A illustrates the controller 12 of the transceiver 10 generating a series of messages, for example probe messages for transmission to the transceiver 50. The messages are transmitted through the 2×2 switch 11, in the bar state, though the fiber 20 to the transceiver 50 as shown by a signal path 201. The controller 12 stores the time these messages are sent. In some embodiments the time these messages are sent are stored as a time-stamp in each message. The format of the messages can be implementation specific. In some embodiments the messages could use an existing framing protocol, e.g., IP, Ethernet, HDLC, etc., or a proprietary format could be used. In some embodiments only a single message is used. In other embodiments a sequence of messages is used so that averaging can be made to improve accuracy of the measurements, as will be discussed below. As shown by the signal path 201 the message(s) are received at the transceiver 50 and passed through the 2×2 switch 51, which is in the bar state, to the receive portion of the transceiver 50. Accordingly the optical signal is converted to electrical current by the photodiode 55, amplified by the post amplifier 56. Then, the received data module 57 extracts and passes the bits for buffering and processing by the controller 52.

Figure 2B:
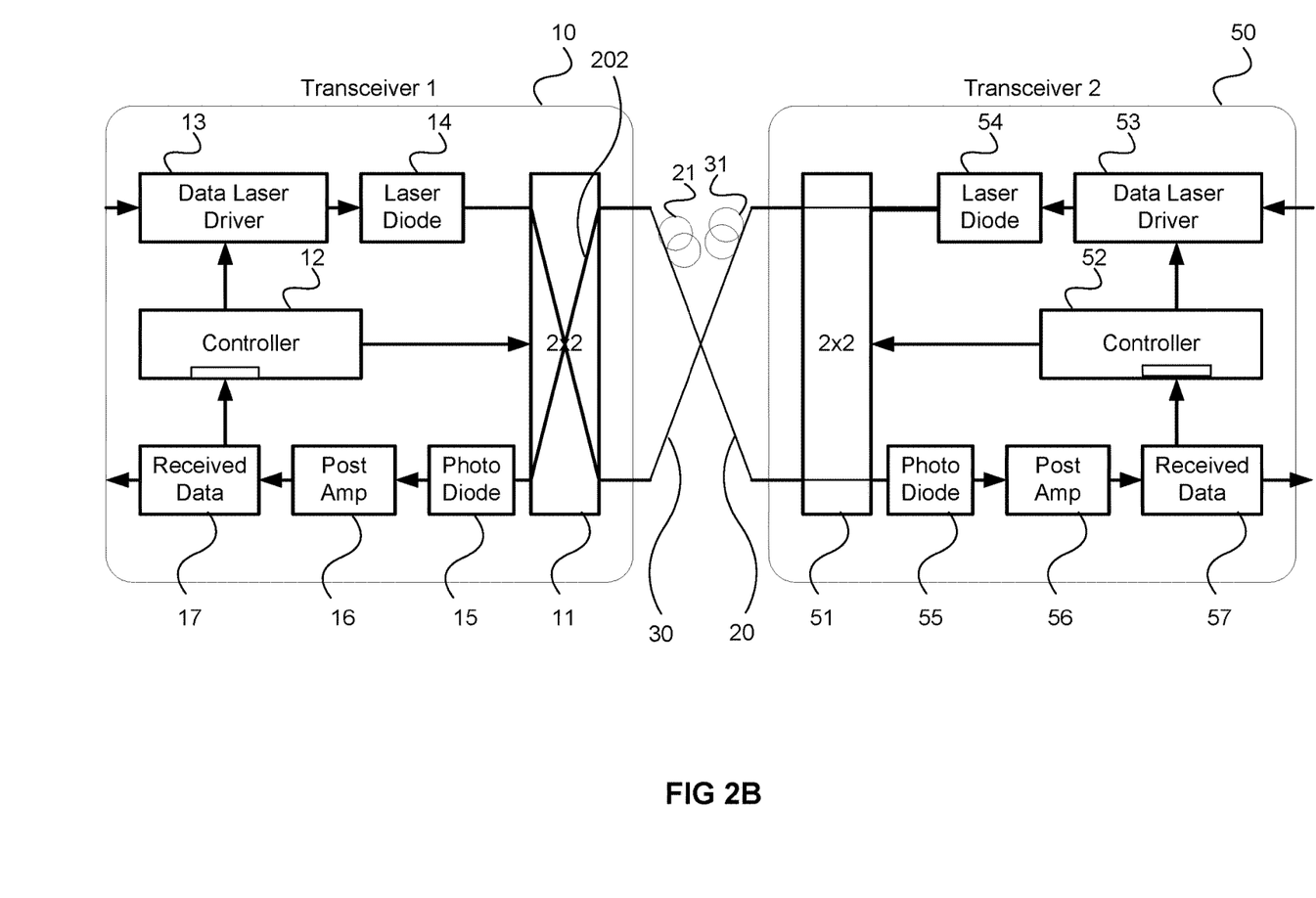

After the message (of the last message in the case of a sequence of messages) is sent, the controller 12 instructs the 2×2 switch 11 to switch to a cross state 202, as illustrated in FIG. 2B. This allows the transceiver 10 to receive reply messages from the transceiver 50 on a same optical fiber, which is the optical fiber 20 in this example.

Figure 2C:
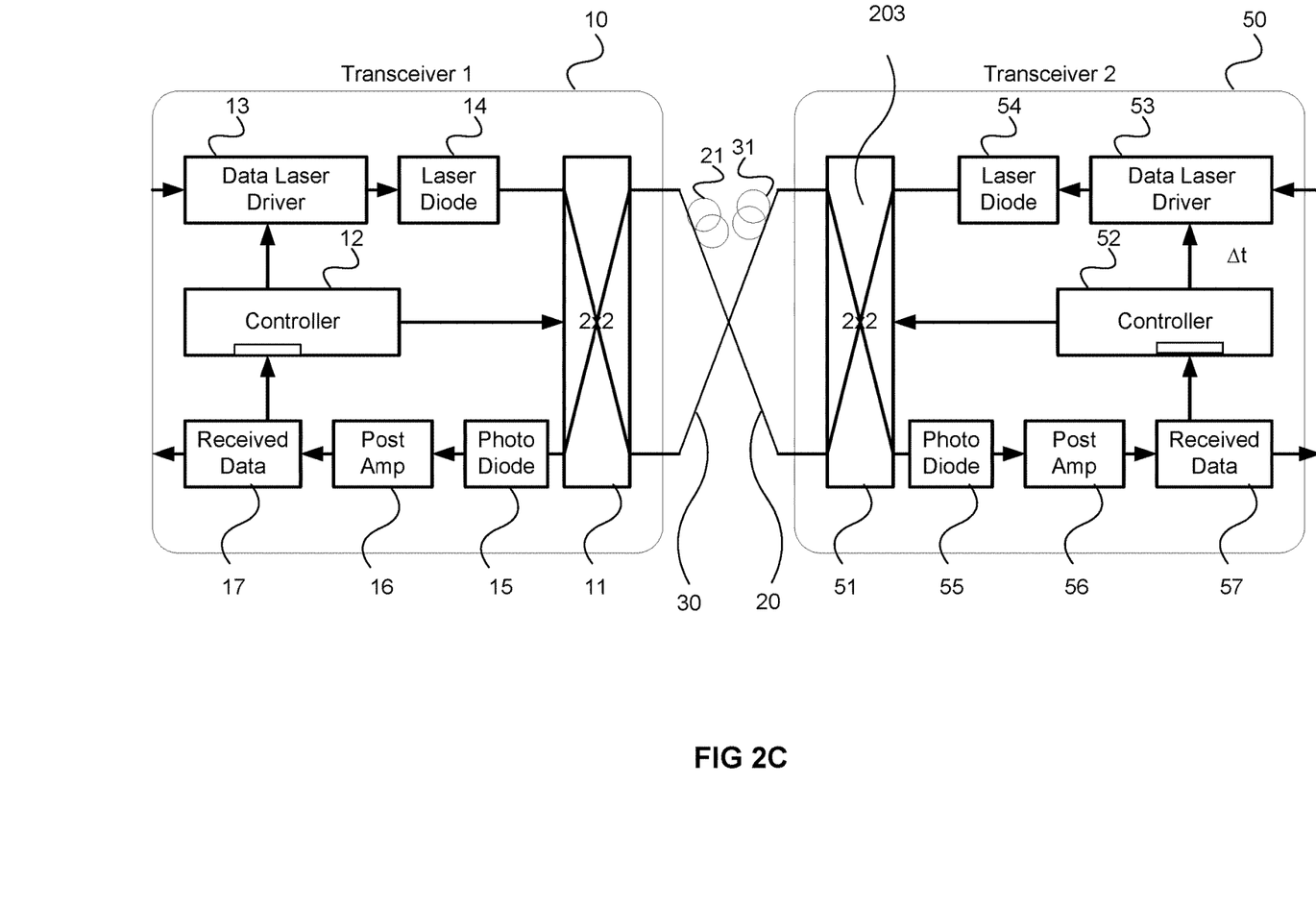
Figure 2D:
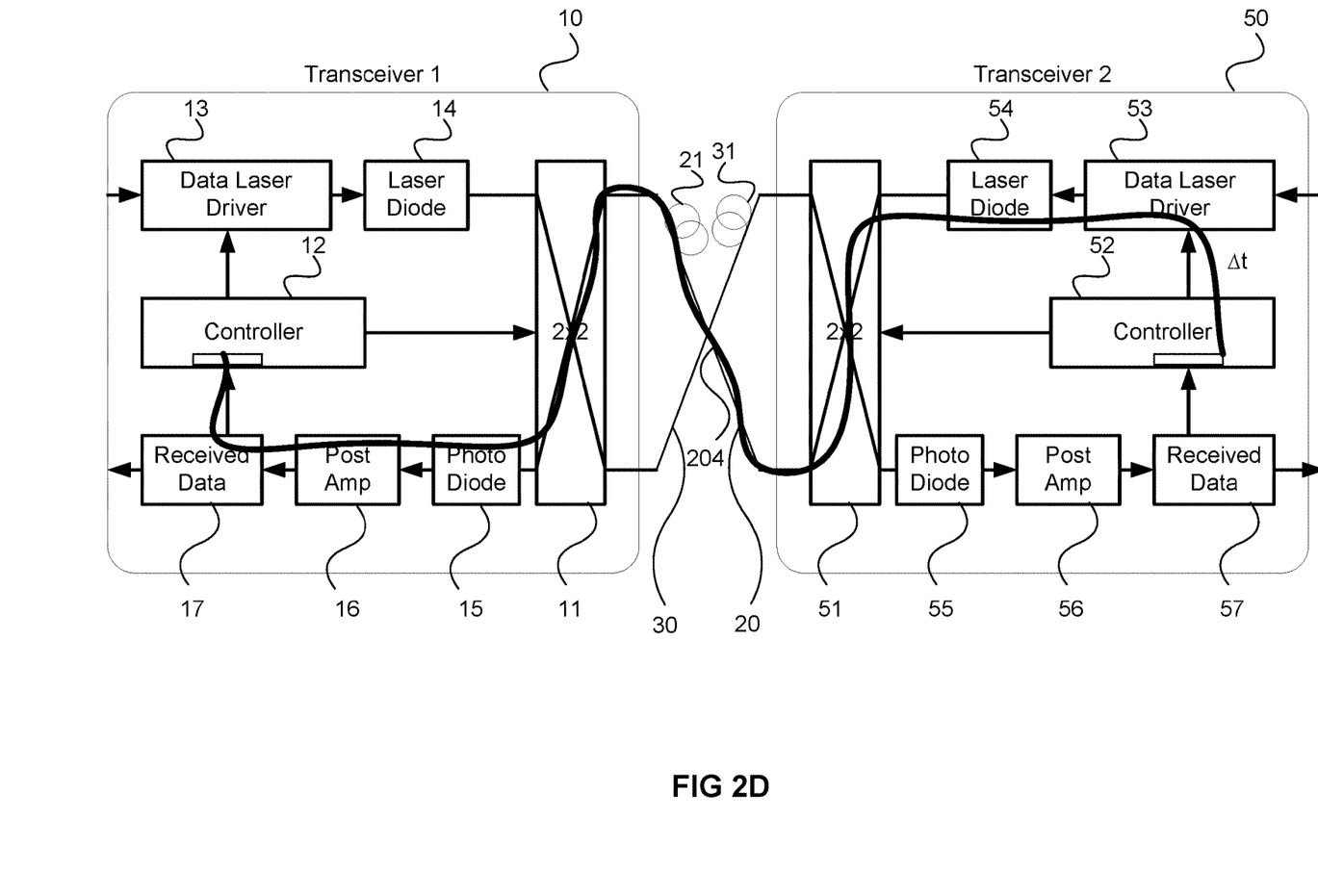

The controller 52 receives the bits for the messages, and stores the time of receipt for each message. The controller 52, upon receipt of messages buffers them and also tracks the wait/processing time $\Delta t$ before the controller 52 sends a reply message for each received message. When the last message of the sequence of messages is received, the controller 52 sets the switch 51 to a cross state 203, as illustrated in FIG. 2C, according to an embodiment. In this manner, the controller 52 configures the transceiver 50 to transmit the reply messages on a same optical fiber from which they are received, namely the optical fiber 20. In some embodiments each reply message includes the received timestamp and the $\Delta t$ value inserted by controller 52. In some embodiments the $\Delta t$ value is determined by the controller 52 for each message, based on actual processing/wait times. As but one example, the controller 52 increments a counter for each clock cycle for each message. In some embodiments, this counter has an initial value of 0. In other embodiments, the initial value of the counter can be set to a number representing the fixed amount of detection time and transmission time at transceiver 50. When the last message arrives and the switch 51 is set up to the cross state 203, these messages can be sent. The value of counter can be sent (raw or converted to actual time based on the clock frequency) to the transceiver 10. If converted to actual time, then the value of $\Delta t$ is transmitted. Otherwise the counter represents an indication of the internal time, and the receiver (i.e., transceiver 10) can determine the value. In other embodiments the controller 52 estimates the value of $\Delta t$. FIG. 2D illustrates the transmission path for the reply messages, according to an embodiment. As can be seen, both of the 2×2 switches 11, 51 are in the cross state for the transmission of the reply message. In some embodiments each controller 12, 52 is configured for an automatic reversion of its corresponding 2×2 switch after T seconds from transmitting the set of messages (e.g., 500 msec) to configure the transceivers for normal operation. Further it is noted that these steps can be repeated for the second optical fiber (i.e., optical fiber 30).

Figure 3:
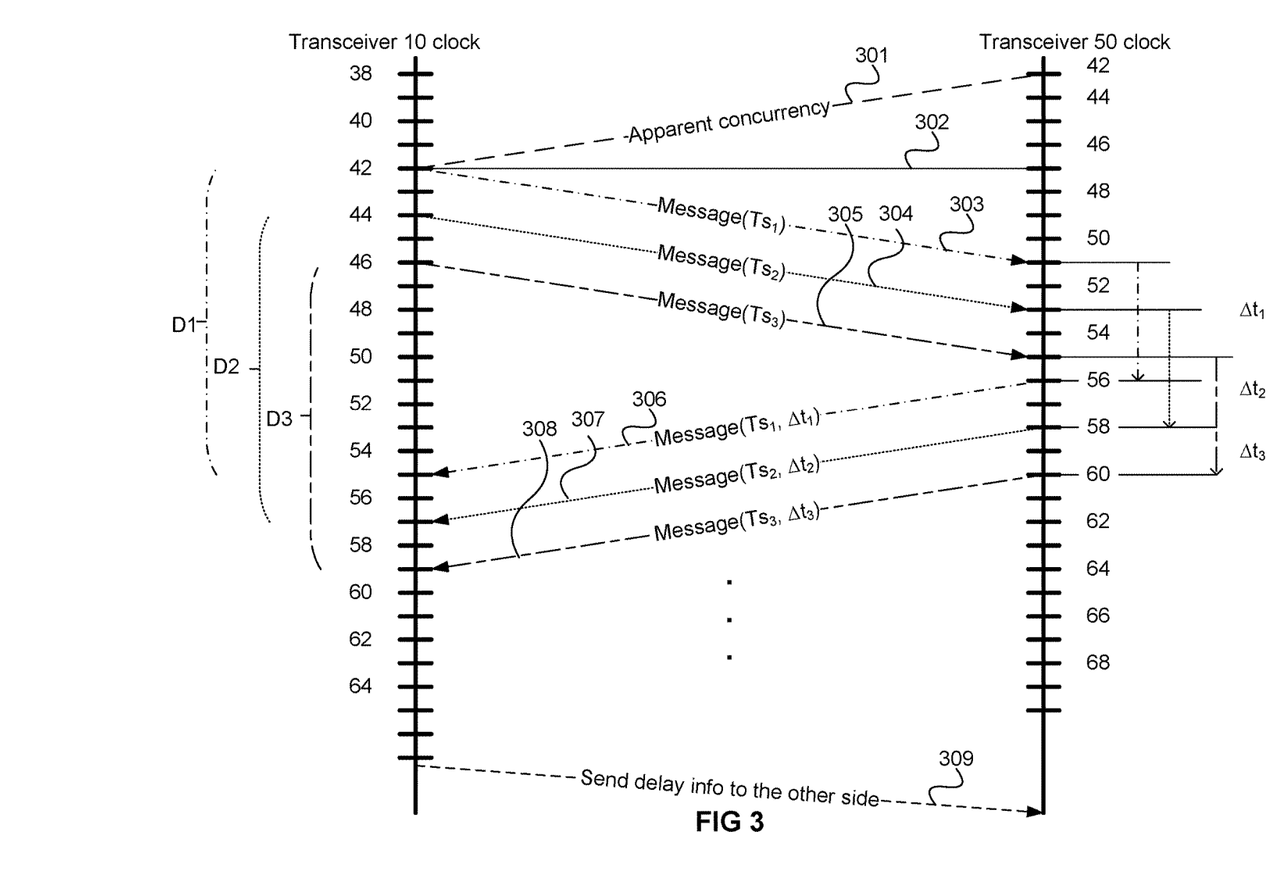
FIG. 3 illustrates a timing diagram according to an embodiment.

FIG. 3 illustrates the timing for 3 messages, according to an embodiment. The left vertical scale shows reference units for the clock of a first transceiver (the transceiver 10). The right vertical scale shows reference units for the clock of a second transceiver (the transceiver 50). A reference line 301 indicates the apparent concurrency between the two reference clocks (i.e., illustrates the points where each reference clock is at a value of 42), whereas a reference line 302 illustrates that the clock for transceiver 2 is offset by 5 reference units. FIG. 3 illustrates 3 messages 303, 304 and 305 transmitted from the transceiver 10 to the transceiver 50, and corresponding reply messages 306, 307 and 308, each with message illustrated with a different dash style. The controller for the transceiver 50 inserts a $\Delta t$ value ($\Delta t_1$, $\Delta t_2$ and $\Delta t_3$) for each reply message as illustrated to the right of the reference clock for transceiver 50, using the same dash style as the corresponding message. In some embodiments the timestamp ($T_{S1}$, $T_{S2}$, and $T_{S3}$) included in each message 303, 304 and 305 respectively, is included in each reply message 306, 307 and 308 as shown. For each message, the values of $D_1$, $D_2$, and $D_3$ as shown to the left of the reference clock, using the same dash style as the corresponding message, indicate the total time between the transceiver 10 transmitting the message and receiving the corresponding reply message. It is noted that the one way propagation delay for each message and reply message is constant (due to the fact that the same optical fiber is used and the speed of light in the fiber is constant). However the values of $D_1$, $D_2$, and $D_3$ include the propagation time for each message (in each direction) and the internal time it takes for transceiver 50 to receive, buffer, process and transmit the corresponding reply message. The $\Delta t$ value for each reply message is an estimate of this internal time. The values $\Delta t_1$, $\Delta t_2$ and $\Delta t_3$ may vary slightly depending on such factors as the load on the transceiver 50, and the measurement error. This is part of the reason a sequence of messages is used, to find an average value which provides a better estimate. In some embodiments, if the samples vary beyond some threshold, the process can be repeated to obtain a better estimate.

Accordingly, the number of messages may vary depending on the precision required. In some embodiments a single message may be sufficient to determine the propagation delay, depending on the accuracy required.

Accordingly, for the embodiment illustrated in FIG. 3, a delay calculation is made for each message as follows:

1-way delay for first message=$(D1-\Delta t_1)/2$ 1-way delay for second message=$(D2-\Delta t_2)/2$ 1-way delay for third message=$(D3-\Delta t_3)/2$ The average value is taken to determine one way propagation delay for the optical fiber in question. As stated above, the process can be repeated to determine the propagation delay for each optical fiber that interconnects two transceivers. In some embodiments these values are used to synchronize the clock of the two transceivers. In some embodiments the first transceiver (e.g., the transceiver 10) will undergo a synchronization process by adjusting its internal clock based on the calculated propagation delay and the $\Delta t_1$, $\Delta t_2$ and $\Delta t_3$ values. In some embodiments the transceiver 10 transmits the calculated one-way propagation delay and its own clock in a message 309 to transceiver 50. This can used so that the second transceiver (e.g., the transceiver 50) can adjust its internal clock.

It should be appreciated that the above calculation includes certain simplifications which will likely suffice for most embodiments. Other embodiments may store and transmit additional information to determine a more precise calculation of the one way delay as:

$$D=(T1-T2-Tt1-Tr2-Td-Tt2-Tr1)/2$$

wherein
T1: Timestamp at Transceiver 10 upon start of transmission;
T2: Time stamp at the Transceiver upon end of a message transmission;
Tt1: Time to transmit a message at transceiver 10;
Tr1: Time to receive a message at transceiver 10;
Tt2: Time to transmit a message at transceiver 50;
Tr2: Time to receive a message at transceiver 50;
Td: Internal time at transceiver 50 (time a message is kept in queue to establish the switch, or receive the rest of sequence, etc); and
D: One way delay.

Figure 4A:
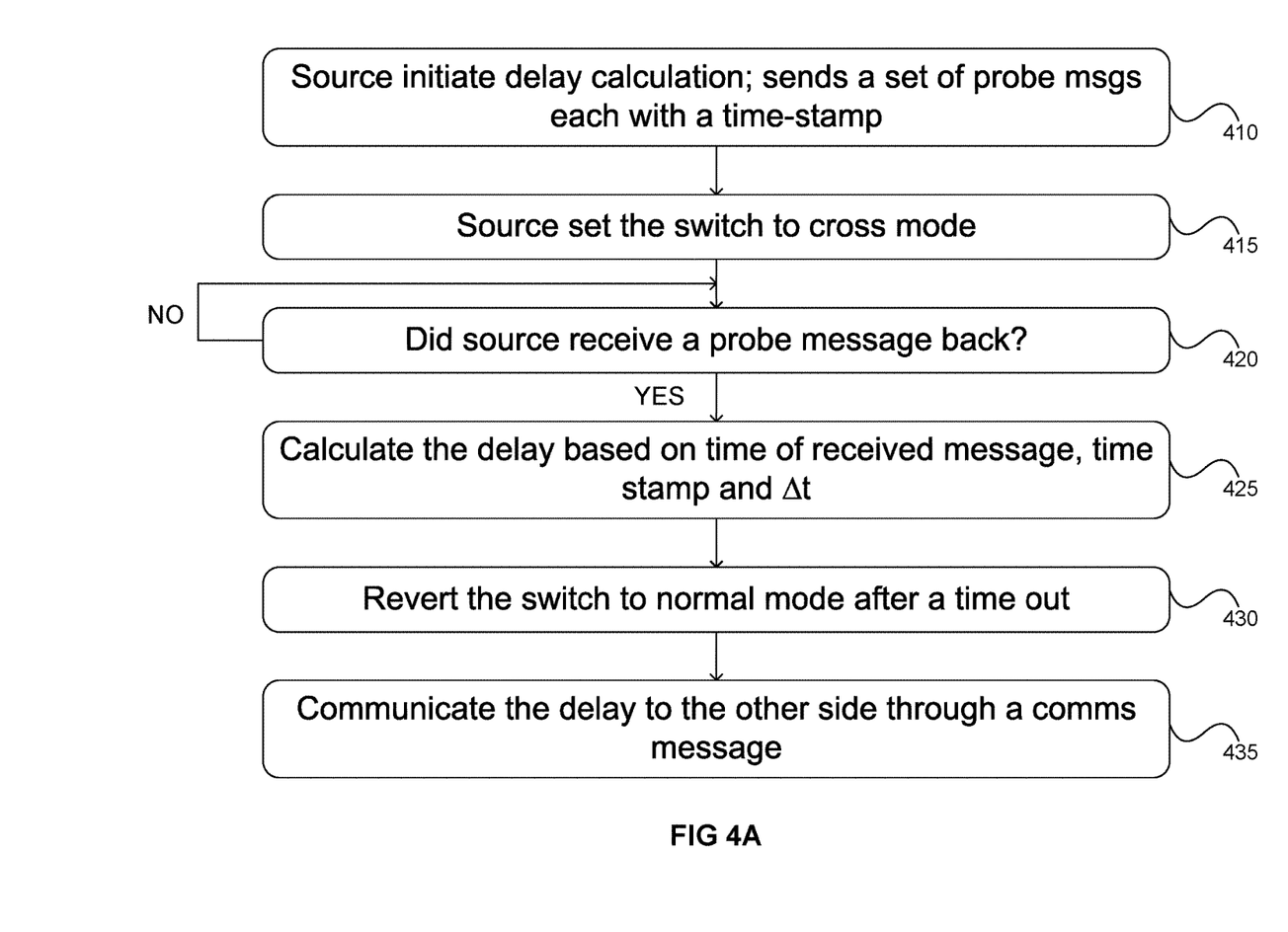
FIG. 4A illustrates a method implemented by the first transceiver according to an embodiment.

FIG. 4A illustrates a method implemented by the controller of the first transceiver (for example the controller 11 of the transceiver 10), according to an embodiment. At step 410, the source transceiver initiates the delay calculation and sends a sequence of probe messages, each with a time stamp. At step 415, the transceiver sets the switch to cross mode. At step 420, the transceiver determines if the transceiver received a probe message back? If no, the process waits by returning to step 415. If yes, at step 425, the transceiver calculates the delay based on the time of the received message, time stamp and Δt. At step 430, the transceiver reverts the switch to normal mode (e.g., configures 2×2 switch 11 to the bar state) after a time out. At step 435, the transceiver 10 communicates the delay to the other side (e.g., transceiver 5) through a communications message. In some embodiments, this message can include the current clock time for the transceiver 10. The bar state and the cross state of both switches can be reversed, in which case the synchronization is achieved by sending signals on the second optical fiber.

Figure 4B:
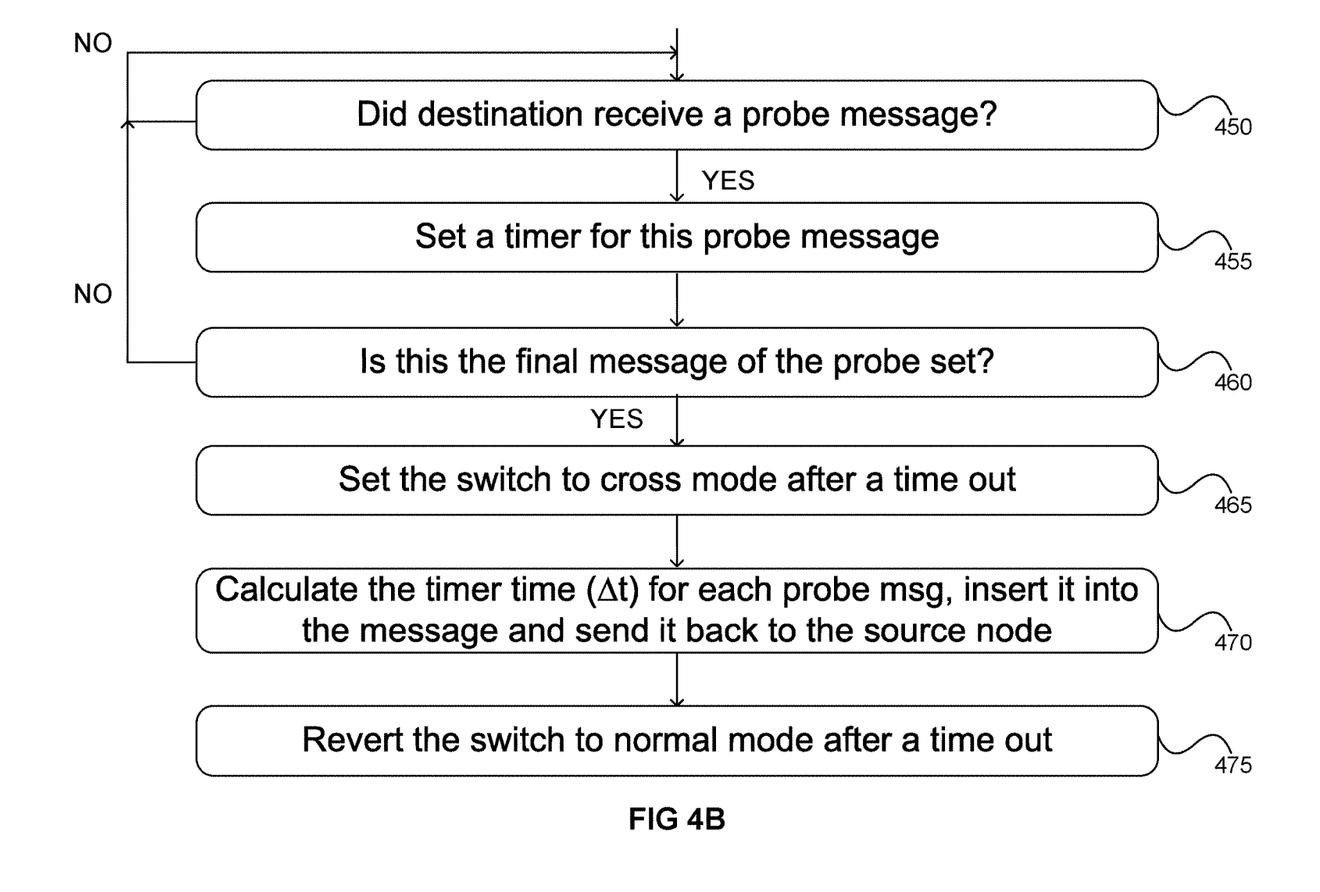
FIG. 4B illustrates a method implemented by the second transceiver according to an embodiment.

FIG. 4B illustrates a method implemented by controller of the second (destination) transceiver (e.g., the controller 52 of transceiver 50), according to an embodiment. At step 450, controller determines if the destination transceiver received the probe message? If yes, at step 455, the controller sets a timer (which can be a counter for system clock cycles) for this probe message. At step 460, the controller determines if the final message of the probe set (i.e., the sequence of messages)? If no, the process returns to beginning to wait for additional messages. If yes, at step 465, the controller sets the switch to cross mode after a time out. At step 470, the controller calculate the timer time (Δt) for each probe message, inserts it into each reply message and transmits the reply messages to the source transceiver node (e.g., transceiver 10). At step 475, the controller reverts the switch to normal mode (i.e., bar state) after a time out so that the transceiver can receive and transmit data in its normal operation mode.

Although the present invention has been described with reference to specific features and embodiments thereof, it is evident that various modifications and combinations can be made thereto without departing from the invention. The specification and drawings are, accordingly, to be regarded simply as an illustration of example embodiments of the invention as defined by the appended claims, and are contemplated to cover any and all modifications, variations, combinations or equivalents that fall within the scope of the present invention.

We claim:

1. A method for determining a propagation delay between a first transceiver and a second transceiver, the method performed by the first transceiver, comprising:
    transmitting a message to the second transceiver over a first optical fiber,
    receiving on the first optical fiber a reply message from the second transceiver including an indication of an internal time for the second transceiver to transmit the reply message, wherein the internal time includes at least part of a time difference between time the second transceiver received the message and time the second transceiver transmitted the reply message;
    determining a time interval from the time the message was transmitted to the time the first transceiver received the reply message;
    repeating the transmitting, receiving and determining steps to determine the time interval and internal time for several samples;
    calculating the propagation delay from the time interval and the internal time for each sample, and calculating an average propagation delay;
    configuring the first transceiver to receive data traffic from the second transceiver on a second optical fiber; and
    synchronizing the first transceiver and the second transceiver using the calculated propagation delay, wherein synchronizing comprises one of:
        adjusting an internal clock of the first transceiver using the calculated average propagation delay and the indication of the internal time, and
        transmitting an instruction to the second transceiver to adjust an internal clock associated with the second transceiver using the calculated average propagation delay and an indication of the internal time.

2. The method of claim 1 wherein the first transceiver stores the transmit time when the first transceiver transmitted the message.

3. The method of claim 2 wherein determining the time interval includes retrieving the transmit time from storage and subtracting the time the reply message was received from the transmit time.

4. The method of claim 1 wherein the message includes a timestamp generated by the first transceiver to indicate the time the message was transmitted, and the reply message includes the timestamp.

5. The method of claim 1 wherein the indication of the internal time includes an internal time delay value inserted by the second transceiver.

6. The method of claim 3 wherein the indication includes:
   a receive timestamp indicating the time the second transceiver received the message; and
   a second timestamp indicating the time second transceiver transmitted the reply message.

7. The method of claim 6 wherein determining comprises subtracting a receive timestamp from the second timestamp.

8. The method of claim 1 wherein a transmitter determines a one-way propagation delay through the first optical fiber by dividing the calculated propagation delay by two.

9. The method of claim 1 wherein both the first transceiver and the second transceiver are linked by a pair of optical fibers including the first optical fiber and a second optical fiber, and both include 2×2 switches for switching a connection from either of the pair of optical fibers between a transmit portion of the transceiver and a receive portion of the transceiver, the method further comprising switching the state of the 2×2 switch between the transmit step and the receive step such that both the transmit message and the receive message traverse the same optical fiber.

10. The method of claim 1 further comprising repeating the transmitting, the determining, and the calculating steps for the second optical fiber of first and second pair of optical fibers to calculate the average propagation delay for the second optical fiber.

11. A method for measuring a propagation delay between a first transceiver and a second transceiver, the method performed by the second transceiver, comprising:
   receiving a message from the first transceiver over a first optical fiber;
   determining an internal time for the second transceiver to transmit a reply message;
   repeating the receiving and determining steps to determine a time interval and internal time for several samples;
   transmitting a reply message including an indication of the internal time on the first optical fiber for each of the several samples;
   wherein the internal time includes at least part of a time difference between the time the second transceiver received the message and the time the second transceiver transmitted the reply message; and
   receiving instructions from the first transceiver to synchronize the second transceiver with the first transceiver, the instructions including an average propagation delay value for the first optical fiber.

12. The method of claim 11 further comprising repeating the steps of receiving, determining and transmitting for a sequence of messages received from the first transceiver over the first optical fiber.

13. The method of claim 12 further reconfiguring the second transceiver to a normal mode of operation in which the second transceiver transmits data to the first transceiver using a second optical fiber.

14. A transceiver comprising:
   a transmit path;
   a receive path;
   a first fiber interface for connecting to a first optical fiber;
   a second fiber interface for connecting to a second optical fiber;
   a switch for switching between a first state and a second state, wherein:
      the first state connects the transmit path to the first fiber interface and the receive path to the second fiber interface; and
      the second state connects the transmit path to the second fiber interface and the receive path to the first fiber interface;
   a processor;
   a non-transient memory for storing instructions which when executed by the processor cause the processor to control the transceiver to:
      transmit a series of messages to a second transceiver on the first optical fiber using the switch in the first state;
      configure the switch to the second state to receive a reply message from the second transceiver on the first optical fiber, the reply message including an indication of an internal time for the second transceiver to process and reply to the message for each of the series of messages;
      calculate an average propagation delay for the first optical fiber using a round trip time and received internal time for each message; and
      cause the processor to synchronize a clock of the first transceiver with a clock of the second transceiver by one of:
   adjusting an internal clock of the transceiver using the calculated average propagation delay and the indication of the internal time, and
   transmitting an instruction to the second transceiver to adjust an internal clock associated with the second transceiver using the calculated average propagation delay and an indication of the internal time.

* * * * *